United States Patent
Kutaragi et al.

[11] Patent Number: 6,122,739
[45] Date of Patent: *Sep. 19, 2000

[54] DIGITAL COMPACT DISC PLAYER SECURITY SYSTEM REPRODUCING METHOD AND APPARATUS

[75] Inventors: Ken Kutaragi; Tetsuya Hirano, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/555,835

[22] Filed: Nov. 13, 1995

[30] Foreign Application Priority Data

Nov. 18, 1994 [JP] Japan .................................. 6-285390

[51] Int. Cl.⁷ ........................................................ G06F 12/14
[52] U.S. Cl. ........................................... 713/200; 380/201
[58] Field of Search .................................... 380/3, 4, 5, 22, 380/23, 25, 201; 395/186, 187.01, 188.01; 369/44.13, 47, 44.26, 275.5, 215.4; 713/200, 201, 202

[56] References Cited

U.S. PATENT DOCUMENTS

| | | |
|---|---|---|
| 4,336,981 | 6/1982 | Mori ........................................ 359/312 |
| 4,454,594 | 6/1984 | Heffron et al. .......................... 713/200 |
| 4,462,076 | 7/1984 | Smith, III ................................ 463/29 |
| 4,942,565 | 7/1990 | Lagadec . |
| 5,155,768 | 10/1992 | Matsuhara .................................. 380/4 |

FOREIGN PATENT DOCUMENTS

| | | |
|---|---|---|
| 545 4722A1 | of 0000 | European Pat. Off. . |
| 0 325 330 A1 | 1/1989 | European Pat. Off. . |
| 0 553 545 A2 | 10/1992 | European Pat. Off. . |
| 0 545 472 A1 | 11/1992 | European Pat. Off. . |
| 0 637 023 A1 | 4/1994 | European Pat. Off. . |

*Primary Examiner*—Robert W. Beausoliel, Jr.
*Assistant Examiner*—Pierre E. Elisca
*Attorney, Agent, or Firm*—Hill & Simpson

[57] ABSTRACT

A security system for preventing disc players from being used with unauthorized software is disclosed. The security code is stored through modulating an offset of the physical position of a plurality of data bits from a nominal track position. A two part optical read head provides an RF signal corresponding to the presence of a physical offset modulation. The RF signal is present when there is a physical offset of the data bits defining a first logical state and the absence of the RF signal defines a second logical state. A digital security code is encoded and decoded in this manner. A system for encoding a security code through modulating the physical offset of a plurality of data bits from a nominal track position is also disclosed.

37 Claims, 6 Drawing Sheets

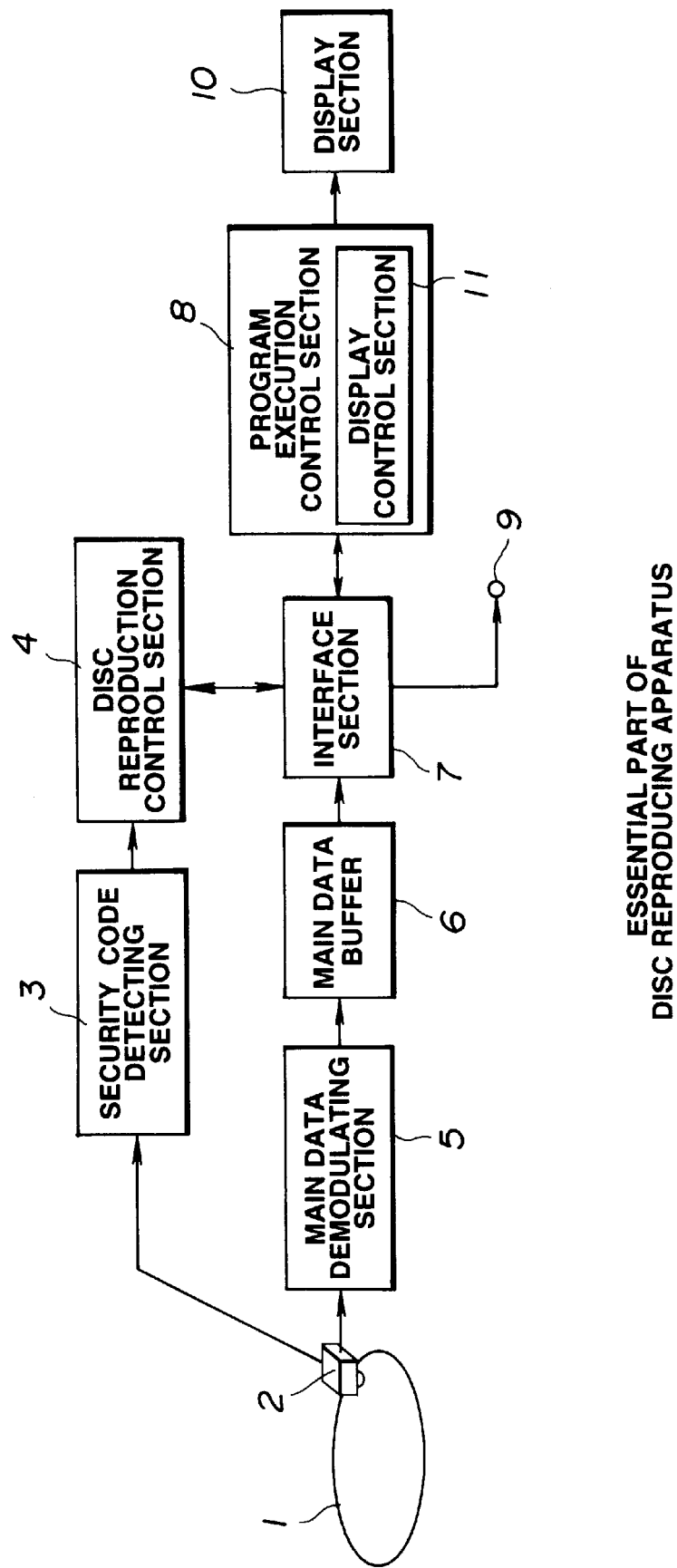
FIG.1 ESSENTIAL PART OF DISC REPRODUCING APPARATUS

FLOW DIAGRAM OF SYSTEM OPERATION

EXAMPLE OF
DISPLAY PICTURE

DIGITAL COMPACT DISC PLAYER SECURITY SYSTEM REPRODUCING METHOD AND APPARATUS

BACKGROUND OF THE INVENTION

1. Field of the Invention

The present invention relates generally to the field of computer software security systems, and, more particularly, the present invention relates to a digital compact disc player security system wherein security code information is stored on a digital optical compact disc through modulating an offset of the physical position of a plurality of optically encoded data bits on the disc from a nominal track position in order to ensure that a disc player system is exclusively used with authorized software containing a predetermined security code.

2. Description of the Related Art

Recently in the field of data storage and retrieval, the use of optical compact discs has grown significantly. Digital optical storage devices have the advantage of having a large storage capacity compared with other forms of data storage. In these systems it is often desirable to protect a dedicated player system from being used with unauthorized software. This is especially true in the video game market where video game manufacturers typically sell game playing devices at or near their cost with the expectation that sales and royalties on the software for the games will provide a large return.

Conventional systems for protecting devices which are capable of operating with a variety of computer software typically employ a security code to protect the system from being used with unauthorized computer software. In a conventional system for preventing a dedicated disc reproducing apparatus from being used with unauthorized software, the system initially determines whether a security code is present at a predetermined memory location of the storage medium which contains the software. The player or reproducing apparatus determines whether or not the software is authorized by comparing the data stored in the predetermined memory location with a security code. This is generally known as a security system or protect processing.

In recent years there has been a number of instances where even systems which have protect processing or security systems have been subject to use with unauthorized computer software. There have been instances where the protect processing has been illegally avoided even with the security system as described above. One reason for this is that in conventional security systems the security code is located in a predetermined memory location which can be readily identified by examining the software. This is also at least partially due to the fact that the determination as to whether or not this recording medium is authorized and execution of the computer program are carried out by the same hardware. The present invention addresses these problems and overcomes the shortcomings of the prior art.

SUMMARY OF THE INVENTION

The present invention provides a digital optical compact disc recording medium which incorporates an improved system for storing and accessing the security code to prevent copying of computer software from an unauthorized disc onto a dedicated disc player. In order to solve the above-mentioned problems, a digital optical compact disc according to the present invention incorporates a security code which is defined by modulation of a physical offset in the radial direction or "wobbling" of the position of a plurality of data bits from a nominal track position. The physical offset modulation is digitally encoded to define a security code.

The security verification method according to the present invention comprises the steps of reading out the modulated physical offset or wobbling of the data bits in the radial direction of the recording medium so that the security code can be detected. The detection step of detecting the certification data or security code is followed by a discrimination step of determining whether or not the certification data which is detected corresponds with a security code previously set in advance. It should be noted that when it is determined during the discrimination step that certification data and the security code set in advance do not match each other, the system inhibits further processing of the disc software, thus preventing unauthorized software from being used with the system.

Additionally, the above mentioned disc recording and reproducing method includes the step of displaying video information identifying the game manufacturer as the licensor or creator of the software. This occurs only when the certification data corresponds with or matches the security code. In the preferred embodiment of the present invention, this occurs after a second check or verification which ensures that the disc contains a proprietary video image or message at predetermined locations of the disc. By incorporating this step into the process of reading the software from the disc, the game manufacturer is able to force anyone who makes unauthorized software for use with the system to violate the copyright or trademark laws. This occurs because the system will automatically display a proprietary screen identifying the game station manufacturer as the creator or licensor of the software. If the software is unauthorized, its creator will automatically be in violation of the trademark laws because the software is not actually authorized or licensed as stated by the display screen.

In order to solve the problems mentioned above, the improved system of the present invention incorporates a means for reading the modulated physical offset or wobbling of the position of a plurality of the data bits on the disc. The physical position of the bits is modulated in the radial direction to define a security code. The security code therefore does not reside in a predetermined memory location but rather is embedded in a general area of the disc by modulating the location of the data bits with respect to a nominal track position. This is advantageous because a person examining the software would be unable to determine the security code. In the preferred embodiment, the presence of the physical offset or modulating is defined to be a logical "1" and the absence of wobbling is defined to be logical "0".

A detecting means for detecting certification data which has been stored by modulating the physical position of a plurality of data bits determines the security code. In the preferred embodiment, the optical read head is divided in two parts in order to determine whether the security code is present. Data bits which are offset from a nominal track location can be detected with such a device. The main data comprising the software for the computer game stored on the disc is also read out with the same read head.

In the preferred embodiment of the present invention, the system performs an initial check to determine whether or not the disc contains a "wobbled" code in the TOC (Table of Contents) area of the disc. In an authorized disc, the security code is repeated several times in order to ensure that it is properly detected without the need to add error correction bits to the security code. The system initially checks to determine whether the disc contains wobbling of the data in the TOC area of the disc before actually checking the actual code. If the disc does not contain a wobbled code, the system then determines if the disc is actually an audio disc. If it is an audio disc the system proceeds to play the audio disc and provide an audio output. If it is not an audio disc then the system shuts down.

If the disc does contain a "wobbled" code in the TOC area of the disc, the player proceeds to decode the wobbled code and transmit this decoded data to a mechanical controller. If the wobbled code matches a predetermined security code, then the system performs a second check on the disc for verifying authenticity. If the wobbled code does not match, the player then checks to see if the disc is an audio disc as noted above. If the disc passes the first code verification, the disc player then proceeds to verify that the disc contains a logo which matches a logo stored in the system. This second verification is performed to verify that the disc is actually authorized.

A preferred embodiment of the disc player security system of the present invention is described in detail below with reference to the attached drawings. Although the preferred embodiment is described with reference to a video game player system it is recognized that this is exemplary only and that other alternate applications are also anticipated.

BRIEF DESCRIPTION OF THE DRAWINGS

FIG. 1 illustrates a block diagram of an exemplary embodiment of the security system of the present invention;

DETAILED DESCRIPTION OF THE PREFERRED EMBODIMENTS

Figure 2A:
FIG. 2A illustrates the typical physical relationship of data bits stored in a track on a digital optical disc.

A preferred embodiment of the disc reproducing apparatus according to the present invention is set forth below with reference to the drawings. In this preferred embodiment, a video game device employs the security system to prevent unauthorized use of a machine with software contained on a digital compact disc. A digital optical compact disc which embodies the present invention has its main or primary data recorded in a conventional manner via EFM (Eight to Fourteen modulation) in NRZ (Non Return to Zero) format. This information resides in the normal track and sector locations on the disc. This is similar to the manner in which conventional audio compact discs are encoded. In the preferred embodiment of the present invention, the data bits which define the TOC (Table of Contents) area of the disc are stored such that a wobbled security code is embedded in the TOC track as a modulation of a physical positional offset from a nominal track location. The security code is stored by a process in which a 22.05 kHz signal is used as the modulation carrier wave which is digitally modulated in NRZ (Non Return to Zero) format to encode the security code. The positional offset which defines the security code is a physical offset in the radial direction of the optical disc. The frequency of the offset is based on the linear velocity of the optical head passing over the track and the resultant reproduction of the offset as an RF signal. It should be noted that the 22.05 kHz signal is a signal having a frequency which is one-half of the sampling frequency of the digital optical compact disc. (44.1 kHz) This allows accurate reproduction of the offset or wobbling signal. The TOC portion of the disc thus has two forms of information stored in this area. First, the TOC may have information digitally encoded and defined as the pits and holes that make up the TOC track. Additionally, the security code is stored through a modulation of a positional offset of the data bits from a nominal track position.

The security code which is stored in the TOC area of a digital optical compact disc in accordance with the present invention thus does not reside in a specific or predetermined track and sector location on the digital optical compact disc. The security code data is typically only several bytes in length. In the preferred embodiment of the present invention, because the security code is not stored in a specific addressable location, it is more difficult for a person examining the software to copy the security code. The code is repeatedly encoded in the TOC area of the disc so that the optical pick-up 2 and security code detector are more likely to correctly identify the presence of the security code.

FIG. 1 illustrates a block diagram of the system used for decoding a security code in accordance with the present invention. In this illustration an optical pick up 2 generates a signal by reading the positional fluctuation of data bits on the disc 1 in the radial direction with respect to a nominal track position. This is considered to be "wobbled" data. Although a single pick-up head generates both the security code and the primary data stored on the disc, two separate hardware sections in the game player process these signals.

A security code detecting section 3 detects the presence of security code based on the so-called "wobbled" data. A disc reproduction control section 4 correlates the security code with a predetermined code stored in the system's memory to determine whether or not the disc is an authorized disc. A main data demodulation section 5 reads out the primary or main data stored on the compact disc for use with the disc player machine. This main data is either the software for a video game or it may alternatively be audio information defining a sound recording. The main data demodulating section 5 feeds a main data buffer 6 having an output which in turn also feeds an interface section 7. The program execution control section 8 controls execution of the software contained on the disc. Display of video information is produced by the display 10. The display is controlled by the display control section 11. The display 10 displays the game information after successful completion of the security code verification. In the preferred embodiment of the present invention, the system also performs a second check to verify that the disc is authentic. This second check verifies that a logo stored in a predetermined location on the compact disc matches a logo stored on the machine. If an audio disc has been inserted into the player, the system will provide an audio signal output from terminal 9.

Figure 2B:
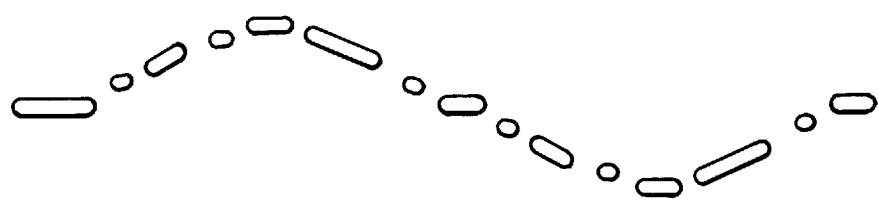
FIG. 2B illustrates the physical offset modulation or wobbling or the data bits from a nominal track position according to the present invention.

FIG. 2A is a greatly enlarged view which illustrates data bits stored on a typical conventional digital optical disc. For the sake of illustration, the data bits are shown in a linear arrangement, however, those skilled in the art will appreciate that the data bits are actually arranged on a conventional disc in a slightly curved pattern to match the curvature of the tracks on the disk. This is also true of digital optical discs which embody the present invention. FIG. 2B illustrates the presence of a wobbled code wherein the physical position of the information bits on the disc are modulated as an offset from a nominal track position to provide a modulated signal which, in the preferred embodiment, is a security code for the disc. The positional offset of the data bits from a nominal track location is in the radial direction of the recording medium. In the preferred embodiment of the present invention the security code is located in the Table of Contents (TOC) area of the disc, however, it is contemplated that other track locations on the disc are equally suitable.

Because the security code is stored numerous times in the TOC area of the disc, the security code can be more reliably reproduced without the need for storing additional error correction bits. The disc player is thus more likely to reproduce the security code accurately if there is a scratch or dust on the disc. Storing the security code numerous times in the TOC area of the disc allows the security code to be stored without also storing additional error correction bits.

Figure 3:
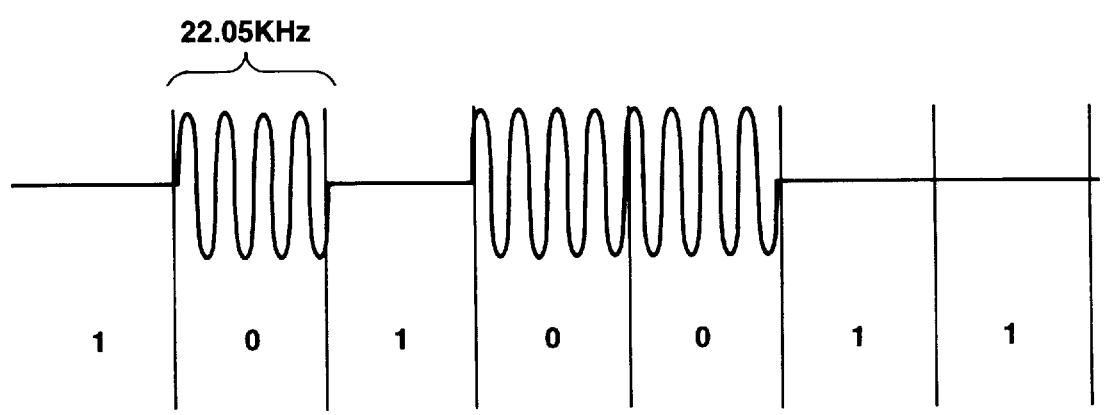
FIG. 3 illustrates decoding of the modulated output based on a physical "wobbling" of the data bits which defines digital data.

FIG. 3 illustrates an example of the resultant digital output from the security code detecting section wherein the presence of wobbling or the physical offset of the data bits from the nominal track position indicates a logical "0" and the lack of wobbling or lack of offset from a nominal track position is indicated as a logical "1". In the preferred embodiment the security code is stored in NRZ (Non return to zero) format. It is understood, however, that alternate schemes for encoding the security code are also possible. In the preferred embodiment the frequency of the offset for the security code is 22.05 kHz which is one half of the sampling frequency of conventional optical compact discs. As seen in the illustration of FIG. 3, the security code is digitally encoded through the presence and absence of a physical offset of the data bits which, when present, is at a frequency of 22.05 kHz. The security code is repeatedly stored in the TOC area of the disc several times as noted.

Figure 4:
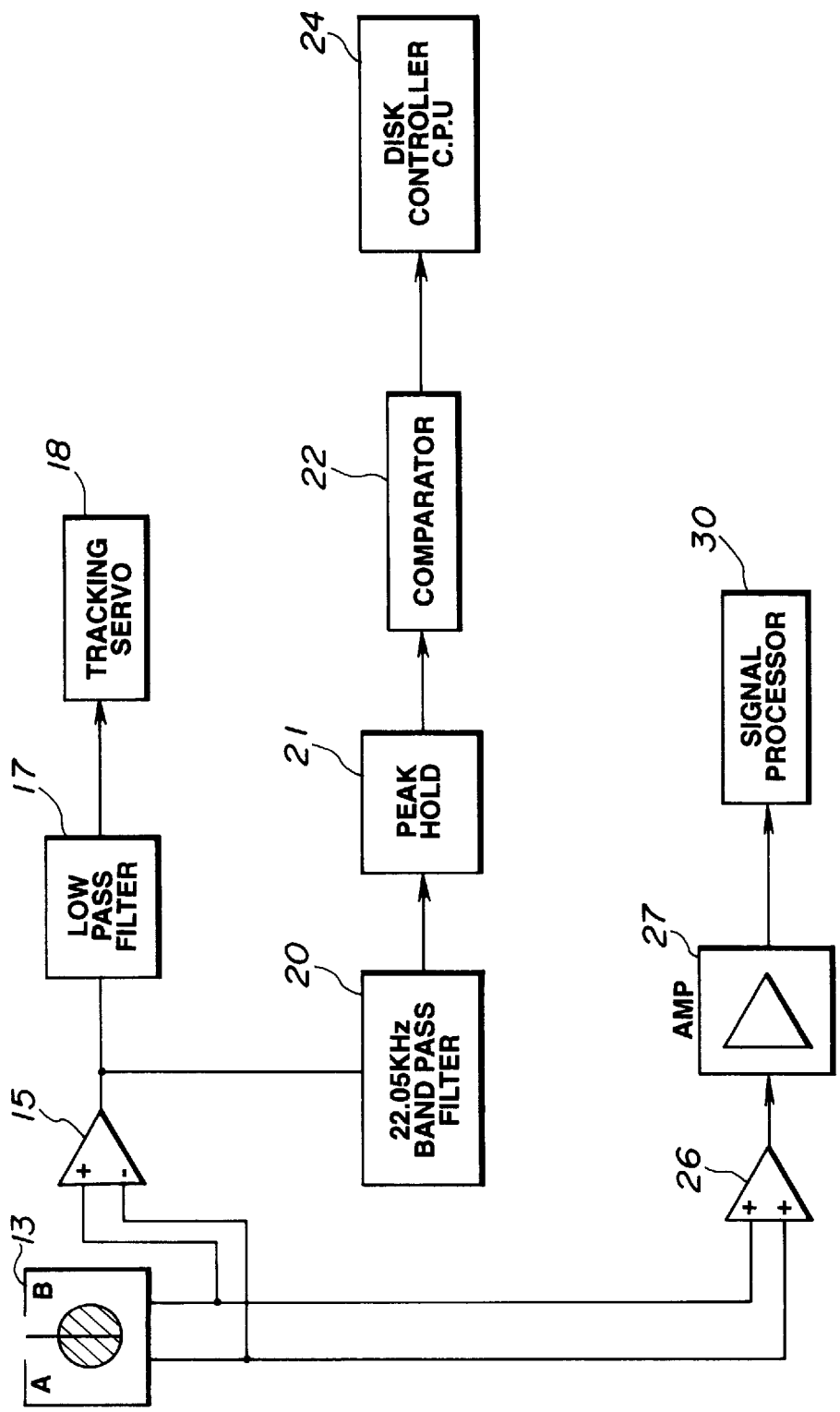
FIG. 4 illustrates a block diagram of an exemplary optical decoder for use with the present invention.

FIG. 4 illustrates an optical signal decoder and corresponding decoding hardware for use with the present invention. The optical detector 13 is comprised of a two part photodetector which is divided into two halves that are positioned above a nominal track position on the disc. The two part photodetector 13 provides one pair of output signals. The pair of output signals is applied to two corresponding inputs of a differential amplifier 15. The differential amplifier has its output connected to the input of a low pass filter 17 which has its output connected to the input of the tracking servo 18. The tracking servo 18 performs positional control of the optical detector 13.

The output of the differential amplifier 15 which is considered to be an RF signal also feeds an input of a 22.05 kHz band pass filter 20. The output of the 22.05 kHz band pass filter 20 feeds the input of a peak hold circuit 21. The output of the peak hold is applied to the input of a comparator 22. The peak hold circuit 21 provides a digital output comprising the signal decoded by examining the TOC track for the presence of "wobbling" or the offset of the data bits from a nominal track position. Because the photodetector 13 is divided into two separate areas, the difference of the two signals generated by the two photodetector areas, identifies the presence of a wobbling or security code which in the preferred embodiment has a frequency of 22.05 kHz. As shown in FIGS. 2 and 3, it is not the actual physical offset of a single data bit which defines a particular bit of the security code, but rather each bit of the security code is defined as the presence or absence of wobbling over a brief period of time. The comparator 22 makes a determination as to whether the disc is authentic based on whether the security code matches a code previously stored in the memory of the disc player. The output of the comparator 22 feeds the input of the disc controller 24.

The pair of outputs from the two pair photodetector 13 also feeds the two inputs of an adder 26. The adder 26 provides a digital output which consists of the main or primary data stored on the disc. This is the data which is determined by the pits and holes on the disc. An output from the adder 26 feeds an amplifier 27 which has an output which is connected to an input of a signal processor 30 for processing the primary data stored on the disc.

Figure 5:
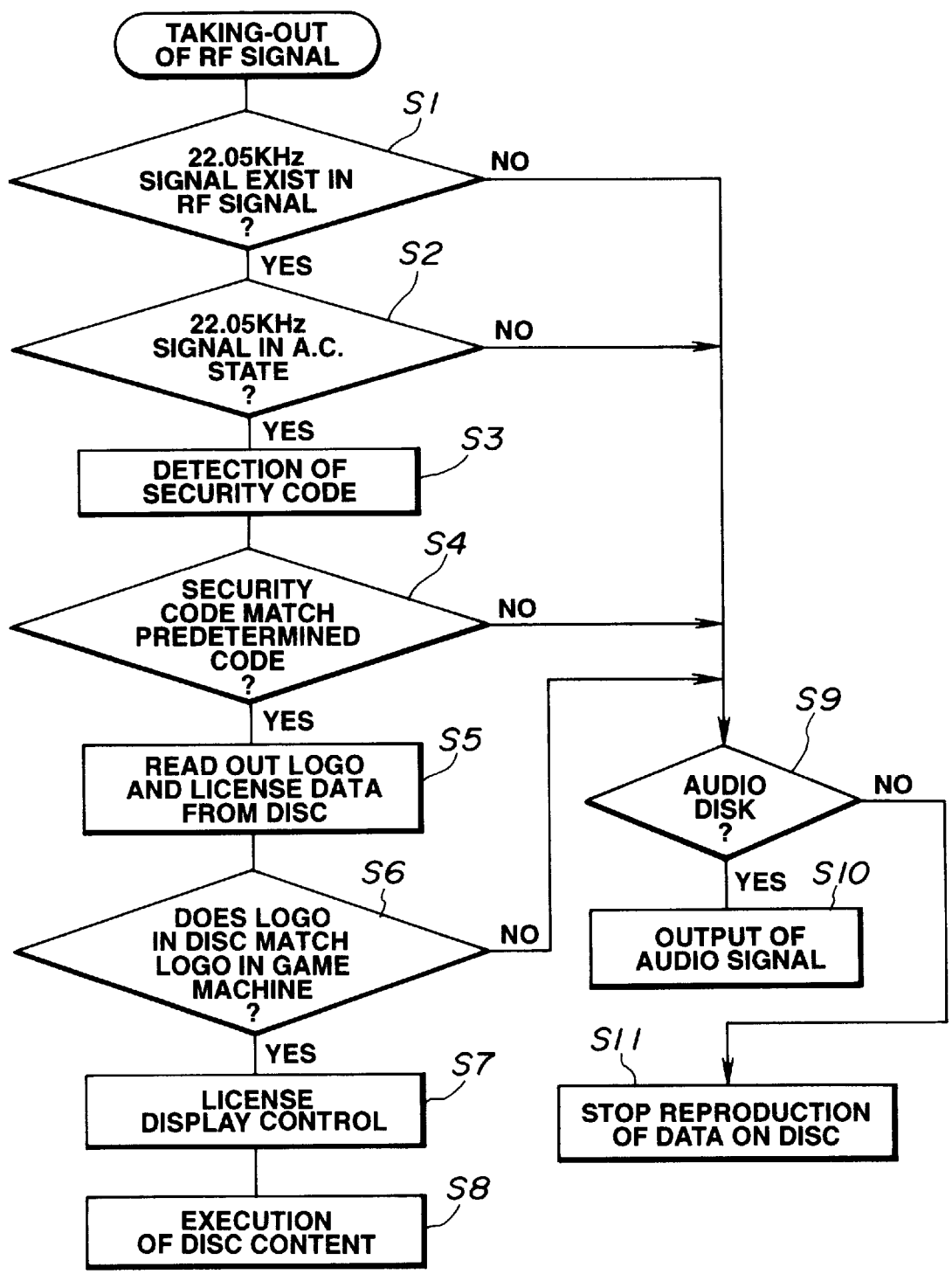
FIG. 5 illustrates a flow chart explaining operation of the disc player security system of the present invention.

A flow chart for explaining the operation of a preferred embodiment of the disc reproducing apparatus is shown in FIG. 5. The security code detecting section 3 of FIG. 1 initially determines whether a 22.05 kHz signal is present as an RF signal generated by the optical pick-up head. This is based on the output from the optical detector 13. If there is wobbling of the data on the disc, the optical detector 13 will provide an RF signal which corresponds to the frequency of the positional offset of the data bits from a nominal track position. In the preferred embodiment of the present invention this is a 22.05 kHz signal. This step is identified as step S1 in the flow diagram of FIG. 5. If it is determined such an RF signal exists as an output from the optical detector, then in step S2, it is determined whether or not the 22.05 kHz signal is in an a.c. state. The determination of whether the 22.05 kHz signal is in an a.c. state is not a determination of whether there is a periodic waveform, but rather this is a determination of whether the wobbled signal changes logical states frequently as identified in FIG. 3. This first check will exclude discs from use on the machine which do have wobbling of the data bits in the TOC track but which do not have the wobbled track modulated to define a digital signal.

If it is determined that the 22.05 kHz signal is in an a.c. state, predetermined demodulation processing in which the 22.05 kHz signal is considered the carrier is performed on the RF signal generated by the optical pick-up in step S3. This is the detection of the security code with the system set forth in FIG. 4. The security code stored on the disc is thereby determined. The security code is then sent to the reproduction control section 4 as shown in FIG. 1. Also if it is determined that the optical pick-up has not generated a 22.05 kHz signal or if it is determined to be in a d.c. state (no wobbling or offset), a signal indicating that the a.c. signal does not exist is sent to the reproduction control section 4.

The disc reproduction control section 4 determines whether the security code stored on the disc and the security code stored on the game or disc reproduction device match or correspond with each other. This occurs in step S4. This determines whether the disc is an authorized disc for the system.

In the system of the present invention, if the disc passes the security code matching which compares the security code stored on the player machine with the wobbled code stored on the disc, the system then performs a second verification. In step S5, the system reads out a logo and/or license data from the disc in order to perform the second verification. The second verification is performed in step S6 wherein the system compares a logo and/or license data stored in memory of the machine with the contents of predetermined memory or storage locations on the disc. This second verification also determines whether the disc is authentic.

Step S7 of FIG. 5 is a step wherein the system will display a visual image identifying the software as being produced or licensed by the game manufacturer. This would force someone who illegally copies the security code to violate the trademark laws because the system would identify the software as being licensed when it is actually not licensed. In the preferred embodiment of the present invention, a logo stored in a memory associated with the player machine is compared with a logo stored in a predetermined memory location on the disc. This occurs in step S6. The system passes control to the software contained on the disc only if the two logos or images match. The system ceases operation if the two logos do not match. This second verification is performed to increase the likelihood of eliminating unauthorized discs from use on the machine. If there is a match, the system will then display the proprietary visual image in step S7. This is described further below.

If it is determined through the two verifications that the disc is authentic, a control signal is generated to instruct that main data transfer occur and that control be passed to the software stored on the disc. The program execution control section 8 illustrated in FIG. 1 sends a signal to the interface section 7 so that the software stored on the disc can be transferred onto the system memory in order to transfer control to this software. This occurs in step S8 of the flow diagram illustrated in FIG. 5. Step S8 which is execution of the disc content will not occur unless the disc also passes the second verification of step S6.

On the other hand, if the security code does not match, or if the 22.05 kHz signal does not exist or if the 22.05 kHz signal is not in an A.C. state, or if the logo does not match the logo on the disc, it is then determined whether the disc is merely an audio disc. This is step S9 in the flow diagram of FIG. 5. If the disc is an audio disc, the system will allow the disc to be played on the unit because it is more desirable that a game device have this alternate capability. The system then outputs an audio signal as identified in step S10 of the flow diagram of FIG. 5. Alternatively, in step S11, if it is determined that the disc is not an audio disc, the system will stop reproduction of the data from the disc and control will not pass to the software on the disc.

Figure 6:
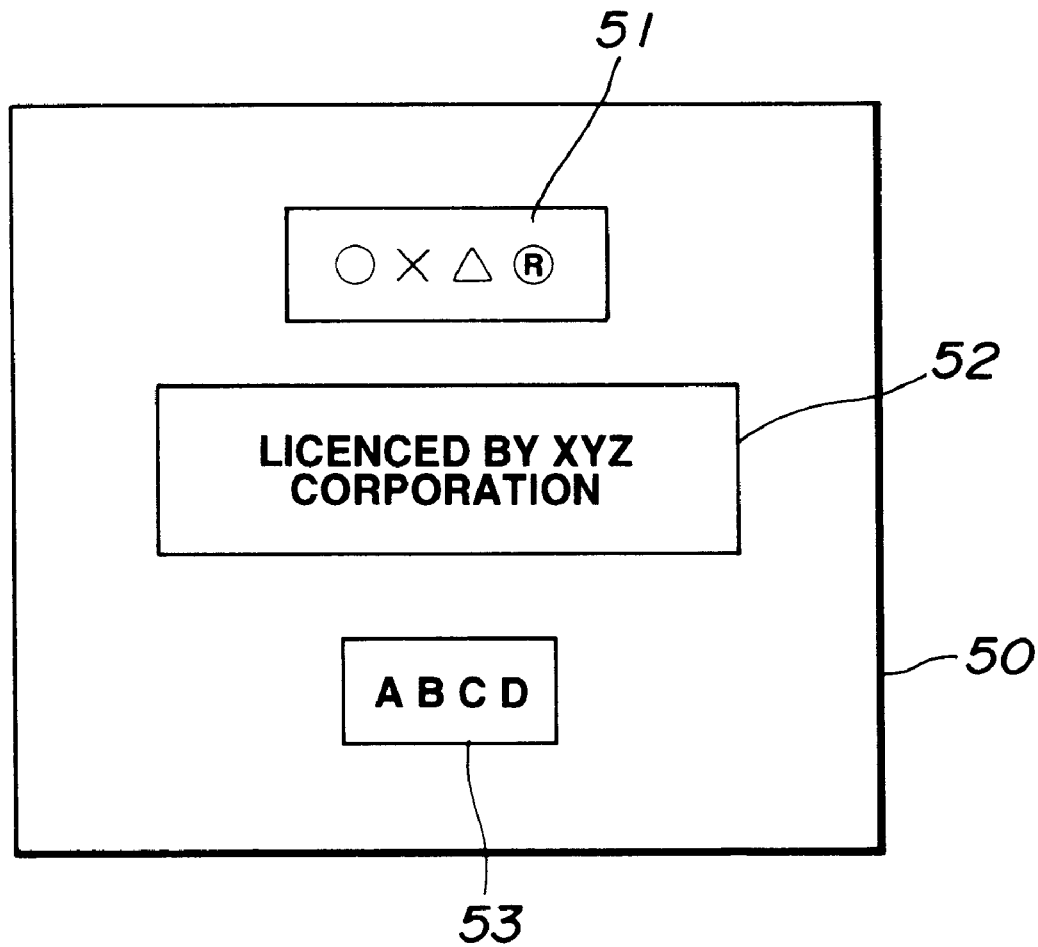
FIG. 6 illustrates an exemplary video display output which is to be displayed after it is determined that the disc has proprietary logo information stored in predetermined memory locations.

FIG. 6 illustrates an exemplary proprietary display which may be used to eliminate disc counterfeiters. The display may include one or more of the visual indicators identified on the screen 50. A registered trademark 51 may be used to force a counterfeiter to violate the trademark laws. Alternatively, an image identifying the software as being licensed by the machine manufacturer may also be used as indicated by block 52. A company name may also be used as indicated by block 53. All of these additional items may be used together or only select ones may be used. These visual indications can be stored in a memory of the system and compared with the contents of specific memory locations on the disc in accordance with the second check or verification identified above. This second verification is identified as step S6 in the flow diagram of FIG. 5. Alternately, a simple code matching may be used to further verify that the disc is authorized. For example, an ASCII code stored in a memory associated with the machine may be compared with the contents of predetermined storage locations on the disc.

Figure 7:
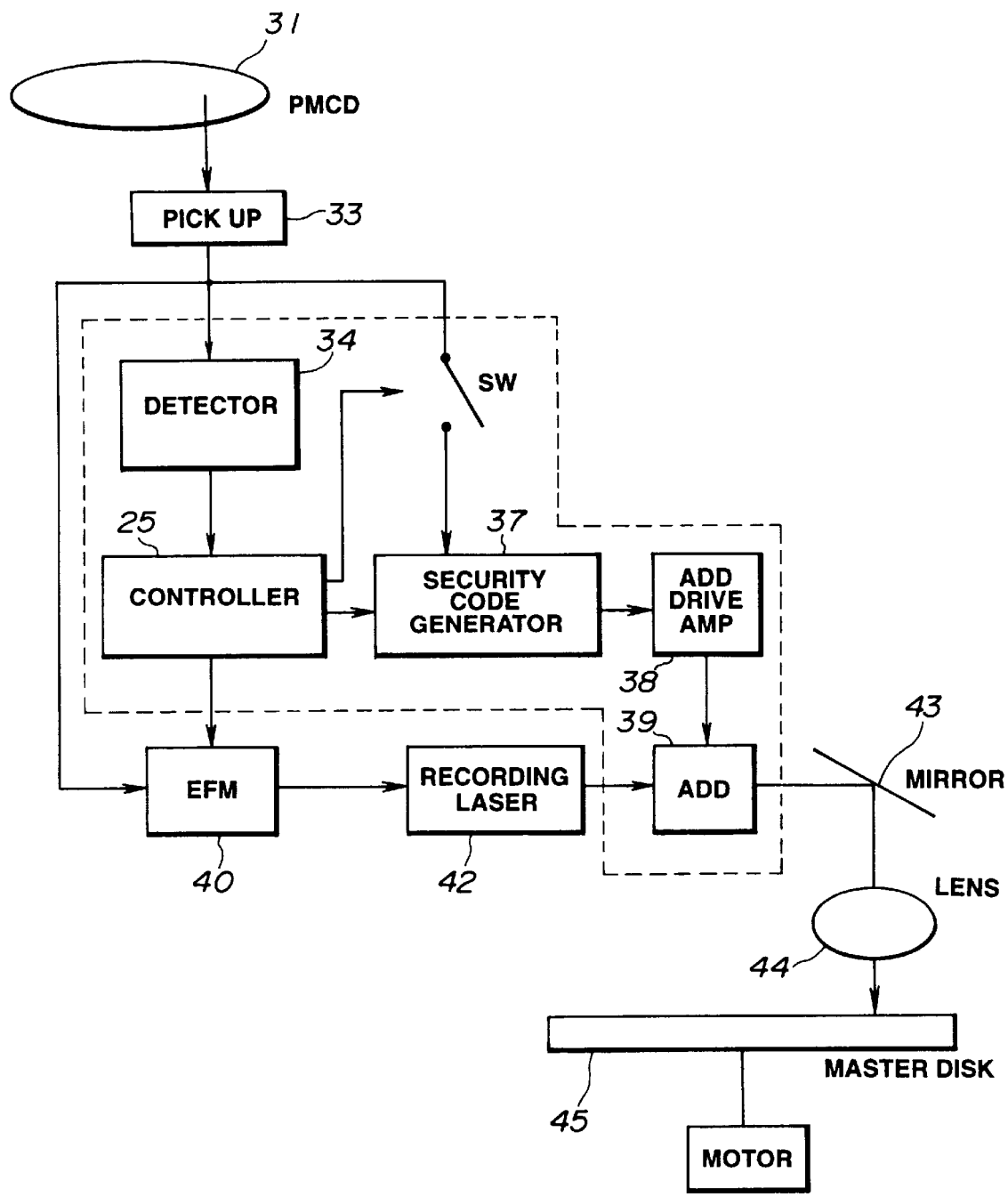
FIG. 7 illustrates a system for encoding a security code on a digital optical disc through offsetting the physical position of a plurality of data bits from a nominal track position in accordance with the present invention.

FIG. 7 illustrates a system for encoding the wobbled security code of the present invention on a digital optical compact disc. Pre-Mastered CD 31 (PMCD) is a master disc having a game program, game data and identification data which identifies the type of the disc stored thereon. The identification data is recorded in a predetermined area of the master disc. The identification data indicates whether the master disc is to be used with a particular game playing device and identification of which country or area of the game is to be used. For example, this information could be Game X—Master Disc—"Japan". The pick-up 33 reads the digitally encoded information from the master disc 31. The detector 34 detects the identification data and the controller 25 transfers the identification to the security code generator 37 if the master disc is identified as being authentic. If the identification data is not detected, the cutting machine operates only as a conventional cutting machine for a compact disc and will not insert a wobbled code.

The security code generator 37 generates a binary security code which depends on the particular country in which the disc is to be sold. For example, the following codes could be used:

Master Disc–Japan=*ABCD*

Master Disc–USA=*EFGH*

Master Disc–Europe=*WXYZ*

The AOD (Acoustic Optic Deflection circuit) drive amplifier 38 amplifies a signal generated by the security code generator 37. The AOD deflection circuit 39 receives an output from the AOD drive amplifier and outputs an RF signal which modulates the physical position of the laser beam with respect to a nominal track position depending on the security code which is supplied from the security code generator 37 in accordance with the coding scheme identified above. For example, the presence of an offset may indicate a logical "1" or first logical condition and the absence of wobbling may indicate a logical "0" or second logical state. The AOD drive 39 is the element which moves the laser in the radial direction off of a nominal track position location for encoding the pits on the CD. The pits on the CD are thus wobbled in response to the RF signal output from the AOD drive amp 39. The physical placement of the pits on the disc is thus modulated from a nominal track position in order to define the security code. The EFM unit 40 encodes the game program and game data as a 14-bit word based on an original 8 bit word. This is known as Eight-to-Fourteen Modulation (EFM). The recording laser 42 provides a signal which cuts the pits on the master disc 45 in a conventional manner after reflection by a mirror 43 and passing through a lens 44. The signal output from the laser 42 is positionally controlled via the AOD 39.

The present invention is subject to many variations modifications and changes in detail. It is intended that all matter described throughout the specification an shown in the accompanying drawings be considered illustrative only. Accordingly, it is intended that the invention be limited only by the spirit and scope of the appended claims.

We claim as our invention:

1. A digital storage medium comprising:
   a plurality of data bits stored on a side of the digital storage medium forming a track of data bits; and
   a security code stored in the track which is defined as modulation of a positional offset of a physical location of the data bits from a nominal track location, wherein the security code is repeatedly stored;
   wherein the digital storage medium is a digital optical disc and the security code is stored in a TOC area of the digital optical disc.

2. The digital storage medium of claim 1, wherein the positional offset of the data bits has a frequency of 22.05 kHz.

3. The digital storage medium of claim 1, wherein the modulation of the positional offset of the physical location of the data bits is in a radial direction of the recording medium.

4. The digital storage medium of claim 1, wherein the modulation of the positional offset of a physical location is a binary modulation wherein an offset of the data bits is defined as first logic state and lack of offset from a nominal track location is defined as a second logic state.

5. The digital storage medium of claim 4, wherein the first logic state is a logical "1".

6. The digital storage medium of claim 4, wherein the security code is stored in Non-Return to Zero format.

7. A method of preventing a processor controlled system from operating with unauthorized software contained in a software storage device comprising the steps of:
   a) examining a track of data bits on a software storage device for a physical offset modulation of the data bits from a nominal track location;
   b) demodulating the physical offset modulation which defines a digital code a plurality of times;
   c) comparing the digital code with a predetermined security code to determine if the digital code matches the predetermined security code;
   d) accepting the software storage device as authentic and passing control of the processor controlled system to the computer software stored in the software storage device if the digital code matches the predetermined security code; and
   e) rejecting the software storage device if the digital code does not match the predetermined security code.

8. The method of preventing a processor controlled system from operating with unauthorized software of claim 7, further comprising the additional step of controlling the display of a predetermined video image only when the step of comparing the digital code with a predetermined security code determines that the digital code matches the predetermined security code.

9. The method of preventing a processor controlled system from operating with unauthorized software of claim 8, wherein the predetermined video image is a proprietary logo and comprising the additional step of controlling the display of the logo on a display screen associated with the system only if the digital code matches the security code.

10. The method of preventing a processor controlled system from operating with unauthorized software of claim 7, comprising the additional step of operating the system in accordance with software stored in the software storage device only when the step of comparing the digital code with a predetermined security code determines that the digital code matches the predetermined security code.

11. The method of preventing a processor controlled system from operating with unauthorized software of claim 7, further comprising the additional step of performing a second verification wherein the system compares a further code stored in a memory associated with the system with a code stored in a predetermined address of the software storage device and further wherein the system rejects the software storage device if the further code does not match the code stored in a predetermined address of the software storage device.

12. The method of preventing a processor controlled system from operating with unauthorized software of claim 11, wherein the further code is a proprietary logo and comprising the additional step of controlling the display of the logo on a display screen associated with the system if the further code stored in a memory associated with the system matches the code stored in a predetermined address of the software storage device.

13. An apparatus for reading a security code stored on a software storage device comprising:
   a device for reading a physical offset modulation of a plurality of data bits in a track of data bits;
   a detector for detecting a code stored in the physical offset modulation having an input connected to an output of the device for reading a physical offset modulation;
   a discriminator for determining whether the code detected by the detector matches a predetermined security code stored in a memory associated with the apparatus; and
   a controller for controlling reproduction of data stored on the software storage device depending on an output from the discriminator;
   wherein the detector detects the code by reading the code a plurality of times.

14. The apparatus for reading a security code stored on the software storage device of claim 13, further comprising:
   a device for reading data stored in a plurality of data bit locations on the software storage unit having an output;
   a device for detecting a second code stored in a plurality of selected data bit locations on the software storage unit connected to an output of the device for reading; and
   a second discriminator for determining whether the second code matches a further predetermined security code stored in a memory associated with the apparatus.

15. The apparatus for reading a security code stored on a software storage device of claim 14, wherein the second code is a logo and further wherein the apparatus further comprises a a device for controlling the display of the logo if it is determined that the second code matches the further predetermined security code.

16. The apparatus for reading a security code stored on the software storage device of claim 13, further comprising a display controller for controlling the display of a predetermined video image indicating that the software storage device is authorized only when the step of comparing the digital code with a predetermined security code determines that the digital code matches the predetermined security code.

17. The apparatus for reading a security code stored on a software storage device of claim 16, wherein the predetermined video image is a proprietary logo and comprising the additional step of controlling the display of the logo on a display screen associated with the system if the digital code matches the code stored in a predetermined address of the software storage device.

18. A method of storing a security code on a software storage device comprising the steps of:
   a) generating a digital security code;
   b) moving the software storage device with respect to a laser source;
   c) positioning the laser source over an unrecorded track location of the software storage device;
   d) while recording a plurality of data bits on the disc, offsetting a position of the laser beam on the software storage device from a nominal track position to define a first logical condition of a data bit of the security code and positioning the laser at a nominal track position to define a second logical condition of a data bit of the security code, and repeating the steps of offsetting and positioning so that the security code is defined repeatedly on the software storage device.

19. The method of storing a security code on a software storage device of claim 18, wherein the first logical condition is a logical "1".

20. The method of storing a security code on a software storage device of claim 18, wherein the step of offsetting the laser beam from a nominal track position location provides a track of data bits on the storage device having a frequency of the offset substantially equal to 22.05 kHz.

21. An apparatus for storing a security code on a software storage device comprising:
   a security code generator for providing a digital security code;
   an amplifier for amplifying the security code;
   a laser beam; and
   a circuit for receiving an output of the amplifier and outputting a signal to modulate a physical position of the laser beam with respect to a nominal track position in accordance with the output of the amplifier, the signal for offsetting a position of the laser beam on the software storage device from a nominal track position to define a first logical condition of a data bit of the security code and positioning the laser at a nominal track position to define a second logical condition of a data bit of the security code, while recording a plurality of data bits on the disc, the signal for modulating the physical position repeating so that the security code is defined repeatedly on the software storage device.

22. The apparatus for storing a security code on a software storage device of claim 21, wherein the first logical state is a logical "1".

23. The apparatus for storing a security code on a software storage device of claim 21, wherein the signal output from the circuit provides a track of data bits on the software storage device having a frequency of the offset modulation substantially equal to 22.05 kHz.

24. A method of reproducing information contained in an information storage device comprising the steps of:
   a) examining a track of data bits on an information storage device for a physical offset modulation of the data bits from a nominal track location with a processor controlled device;
   b) demodulating the physical offset modulation to define a digital code;
   c) comparing the digital code with a predetermined security code to determine if the digital code matches the predetermined security code;
   d) rejecting the information storage device if the digital code does not match the predetermined security code;
   e) examining the information storage device to determine if the information storage device contains information other than a computer program; and
   f) allowing a user to download information from the information storage device without passing control of the processor controlled device to software contained in the information storage device if the step of examining determines that the information storage device contains information other than a computer program.

25. The method of reproducing information contained in an information storage device of claim 24, further comprising a step of playing audio information contained in the information storage device through an audio system if the codes do not match.

26. The method of reproducing information contained in an information storage device of claim 24, further comprising a step of demodulating the physical offset modulation to repeatedly define a digital code.

27. The method of reproducing information contained in an information storage device of claim 24, further comprising a step of controlling the display of a predetermined video image only when the step of comparing the digital code with a predetermined security code determines that the digital code matches the predetermined security code.

28. The method of reproducing information contained in an information storage device of claim 27, further comprising a step of performing a second verification wherein the system compares a further code stored in a memory associated with the system with a code stored in a predetermined address of the information storage device and further wherein the system rejects the information storage device if the further code does not match the code stored in a predetermined address of the information storage device.

29. The method of reproducing information contained in an information storage device of claim 27, wherein the predetermined video image is a proprietary logo and comprising the additional step of controlling the display of the logo on a display screen associated with the system if the further code stored in a memory associated with the system matches the code stored in a predetermined address of the software storage device.

30. An apparatus for reproducing information contained in an information storage device comprising:
   a) a device for examining a track of data bits on an information storage device for a physical offset modulation of the data bits from a nominal track location in a processor controlled device;
   b) a device for demodulating the physical offset modulation to define a digital code;
   c) a device for comparing the digital code with a predetermined security code to determine if the digital code matches the predetermined security code;
   d) a device for rejecting the information storage device if the digital code does not match the predetermined security code;
   e) a device for examining the information storage device to determine if the information storage device contains information other than a computer program; and
   f) a device for allowing a user to download information from the information storage device without passing control of the processor controlled device to software contained in the information storage device if the step of examining determines that the information storage device contains information other than a computer program.

31. The apparatus for reproducing information contained in an information storage device of claim 30, further comprising an audio device for playing audio information contained in the information storage device if the codes do not match.

32. The device for reproducing information contained in an information storage device of claim 30, further comprising a device for demodulating the physical offset modulation to repeatedly define a digital code.

33. A digital storage medium comprising:
   a plurality of data bits stored on a side of the digital storage medium forming a track of data bits; and
   a security code stored in the track which is defined as modulation of a positional offset of a physical location of the data bits from a nominal track location, wherein the security code is repeatedly stored;

wherein the modulation of the positional offset of a physical location is a binary modulation wherein an offset of the data bits is defined as first logic state and lack of offset from a nominal track location is defined as a second logic state;

wherein the first logic state is a logical "1".

34. A digital storage medium comprising:

a plurality of data bits stored on a side of the digital storage medium forming a track of data bits; and a security code stored in the track which is defined as modulation of a positional offset of a physical location of the data bits from a nominal track location, wherein the security code is repeatedly stored;

wherein the modulation of the positional offset of a physical location is a binary modulation wherein an offset of the data bits is defined as first logic state and lack of offset from a nominal track location is defined as a second logic state;

wherein the security code is stored in Non-Return to Zero format.

35. A method of preventing a processor controlled system from operating with unauthorized software contained in a software storage device comprising the steps of:

a) examining a track of data bits on a software storage device for a physical offset modulation of the data bits from a nominal track location;

b) demodulating the physical offset modulation which defines a digital code;

c) comparing the digital code with a predetermined security code to determine if the digital code matches the predetermined security code;

d) accepting the software storage device as authentic and passing control of the processor controlled system to the computer software stored in the software storage device if the digital code matches the predetermined security code;

e) rejecting the software storage device if the digital code does not match the predetermined security code; and f) controlling the display of the a predetermined video image only when the step of comparing the digital code with a predetermined security code determines that the digital code matches the predetermined security code.

36. A method of preventing a processor controlled system from operating with unauthorized software contained in a software storage device comprising the steps of:

a) examining a track of data bits on a software storage device for a physical offset modulation of the data bits from a nominal track location;

b) demodulating the physical offset modulation which defines a digital code;

c) comparing the digital code with a predetermined security code to determine if the digital code matches the predetermined security code;

d) accepting the software storage device as authentic and passing control of the processor controlled system to the computer software stored in the software storage device if the digital code matches the predetermined security code;

e) rejecting the software storage device if the digital code does not match the predetermined security code; and f) performing a second verification wherein the system compares a further code stored in a memory associated with the system with a code stored in a predetermined address of the software storage device and further wherein the system rejects the software storage device if the further code does not match the code stored in a predetermined address of the software storage device.

37. An apparatus for reading a security code stored on a software storage device comprising:

a device for reading a physical offset modulation of a plurality of data bits in a track of data bits;

a detector for detecting a code stored in the physical offset modulation having an input connected to an output of the device for reading a physical offset modulation;

a discriminator for determining whether the code detected by the detector matches a predetermined security code stored in a memory associated with the apparatus;

a controller for controlling reproduction of data stored on the software storage device depending on an output from the discriminator; and a display controller for controlling the display of a predetermined video image indicating that the software storage device is authorized only when the step of comparing the digital code with a predetermined security code determines that the digital code matches the predetermined security code.

* * * * *